UNITED STATES PATENT OFFICE.

HENRY A. MANN, OF TROY, NEW YORK, ASSIGNOR TO THE ANTIAQUA COMPANY, OF ALBANY, NEW YORK, A CORPORATION OF NEW YORK.

PROCESS OF STIFFENING AND MAKING IMPERVIOUS TO WATER STARCH-FILLED AND IRONED LAUNDRY-FINISHED SUBSTANCES OF BODIES OF COLLARS, CUFFS, &c.

SPECIFICATION forming part of Letters Patent No. 700,793, dated May 27, 1902.

Application filed April 22, 1901. Serial No. 56,982. (No specimens.)

*To all whom it may concern:*

Be it known that I, HENRY A. MANN, a citizen of the United States, and a resident of Troy, in the county of Rensselaer and State of New York, have invented a new and useful Improvement in Processes of Stiffening and Making Impervious to Water Starch-Filled and Ironed Laundry-Finished Substance of the Bodies of Collars, Cuffs, &c., of which the following is a specification.

This invention relates to the process of treating the starch-filled and laundry-finished bodies of collars, cuffs, &c., with a stiffening and water-resisting agent consisting of a syrup-like solution of soluble cotton forced into the starch-filled substance of said bodies under great pressure from flexible transferring-rollers.

The objects of this invention are to increase to a large per cent. the normal stiffness of the starch-filled laundry-finished bodies of collars, cuffs, &c., and to make the same impervious to perspiration and to water (in natural condition) and for effecting a uniform introduction into the said starch-filled bodies of said articles of said solution and preventing excess of soluble cotton remaining on the surface of the said bodies, and thereby change the normal laundry-finish appearance of the surface of said articles, and, further, for limiting the quantity of soluble cotton introduced into the bodies of the same and effecting a uniform distribution of such limited quantity and preventing a surface coating of said bodies with said stiffening and water-resisting agent.

I have discovered that soluble cotton introduced under force of great pressure and in condition of a solution of consistency of a syrup or to a liquid of consistency between water and syrup in a limited or minimum quantity into the starch-filled bodies of collars, cuffs, &c., after having been ironed and laundry-finished ready for wear will stiffen the bodies of such articles to a degree fully equal to that obtained by an increase of the number of plies therein by one additional ply in the starched and laundry-finished article.

I have also discovered that this small quantity of soluble cotton applied in like condition and evenly by force from a great pressure from revolving flexible rollers operates to change the starch-filled bodies of those articles into water-resisting bodies which are of character adapting them to be changed back to water-absorbing bodies simply by the operation of washing them in heated alkaline solutions or waters, as practiced by laundrymen when relaundrying soiled collars, cuffs, &c., and I have also discovered that by avoiding a surface coating of the laundry-finished bodies of said articles their normal appearance of surface finish will not be in the least changed or affected by the soluble cotton and that the presence of the latter in the laundered article cannot be detected by the eye of an observer, but most readily by immersion of those articles in water in natural condition.

In the practice of this invention I employ solely soluble cotton of commerce and proceed as follows:

First. Producing a suitable solution of the soluble cotton by dissolving the same within a suitable vessel by any one of the suitable solvents of the same, such as alcohol and ether, amyl acetate, acetone, &c., in contradistinction to nitrocellulose, which latter being cellulose chemically changed in such a manner as to be highly explosive. This solution of soluble cotton I produce by employing any one of the above-mentioned solvents in proportions as follows: To each five (5) dry ounces, by weight, of the soluble cotton I use one (1) gallon, by measure, of the solvent selected to be used. Because of the greater expense attending the use of alcohol and ether as a solvent I prefer to use for the solvent amyl acetate or acetones, &c., which are known as solvents which do not chemically change cellulose into a highly-explosive substance. This solution of soluble cotton so produced will be of consistency of a syrup or thinner, as between that of water and syrup, by a suitable increase of the solvent employed.

Second. I prepare the collars, cuffs, &c., for receiving in their bodies this solution of soluble cotton by washing the same and filling the fabric of said bodies with starch and ironing them, as commonly practiced by laundrymen for giving the articles a laundry surface finish ready for wearing.

Third. I next effect a rapid and cleanly transfer of a very small portion of the above-described soluble-cotton solution from a suitable receptacle to the body of each of the laundry-finished articles, to be further stiffened and made water-resisting by immersion of the articles in the thinner solution and then removing the excess of surface coating of the same by passing the said bodies successively between a pair of suitable flexible rollers, which are set closely together, so as to forcibly pinch the said bodies in their passage, as does a wringing-machine, yet I prefer to use a thicker solution and employ flexible rollers which are revolved continuously and uniformly in contact with such thicker soluble-cotton solution, which solution because of its density and stickiness will itself be made to assume the condition of a rolling body revolved by the action of one of the rollers, which may operate as a solution-transferring roller, and rolling in contact with said roller and parting with only the small portions of its substance which may adhere to the surface of such transferring-roller, which small portions of said solution are now transferred to the bodies of the laundered articles while in passage between said pair of rollers in direction from the thinly-coated-surface side of the transferring-roller toward the opposite side of the same. In the passage of said laundered bodies in their entire length between the said rollers and out therefrom to the opposite side thereof the said bodies will be out of contact with the revolving body of the said soluble-cotton solution and will receive its proper quantity of this solution, which is thus sparingly yet sufficiently supplied to the transferring-roller from the revolving mass or body of the said solution, and a sufficient quantity of this small amount of the solution will be forced by the pressure of the two rollers into the starch-filled body of each laundered article and also so as to uniformly permeate said body in all its area and its thickness of substance between its surfaces and at the same time cast back from the said bodies of the treated articles any excess of said solution, so that a varnish-like coating of the surfaces of the same may be avoided.

By this process starch-filled and laundry-finished articles of wear may have their normal stiffness increased a large per cent. over that of the same articles which are stiffened solely by starch-filling and ironing, as commonly done by laundrymen, and the articles treated by the practice of this process are made to be water-resisting to such a high degree that neither the substance of the bodies of the same nor their normal appearance of surface finish will be in the least affected in fact or appearance when immersed in water in natural condition. Further, by the practice of this invention the great increased stiffness of the said articles and the water-resisting quality mentioned may be given to starched and laundry-finished articles in a cleanly and most expeditious manner with great economy and saving of both time and material and obviates the use of large and expensive quantities of solvents of the substances used as the base substance for making fabrics water-repellent or waterproof by process of immersing or spraying the articles with thin liquid-treating solutions, as paraffin solutions, as heretofore practiced, and also obviates the use of large drying-chambers and heat for drying the applied solutions before the articles can be freely handled.

This invention gives to starch-filled laundry-finished articles not only increased stiffness of the bodies of the same and makes them impervious to perspiration and water in natural condition, but also gives to the substances in these laundry-finished bodies a new condition, under which the soluble cotton or cellulose which stiffens and makes bodies of fabrics impervious may be wholly eliminated by the simple practice of laundry processes for washing soiled articles for personal wear or use, and thereby permit them to be relaundered the same as heretofore and subsequently re-treated for increasing their common laundry-given stiffness and making them again impervious to perspiration and to water in natural condition.

I am not aware that this new condition or quality resulting from the practice of this invention and operating to effect a stiffening of starch-filled and laundry-finished articles, as collars, cuffs, &c., above that which may be normal in these articles and the rendering them impervious to water and subsequently allow a removal from the said articles of such stiffness and give to their bodies the water-absorbing quality they previously had was ever before practiced by use of nitrocellulose or soluble cotton, or compound preparations of the same, although used as a base substance for waterproofing, varnishing, or cementing papers or fabrics as heretofore done or practiced.

It is to be understood that should this syrup-like or a thinner solution of soluble cotton be applied to the surfaces of laundered articles by means of a brush or other surface-applying instrument it operates only as a varnish-like coating which will remain nearly all if not entirely outside of the substance of the starched and laundry-finished surfaces of the article so applied to and when dry will produce on the said surfaces a varnish-like gloss, and thereby materially change and destroy the normal laundry finish of articles so applied to.

Having described my invention, what I claim, and desire to secure by Letters Patent, is—

1. The process above described for increasing the stiffness of a starch-filled and laundry-finished collar, cuff, &c., by means of soluble cotton and so that said stiffness arising from the presence of said soluble cotton may readily be removed from the same by washing in heated alkaline waters, the same consisting in forcing, under pressure of suitable revolving flexible rollers, into the substances of the body of said starch-filled and laundry-finished article a solution of soluble cotton and amyl acetate, acetone, &c., in condition of consistency described and freeing the surfaces of said article from all appearance of said solution, substantially as herein described.

2. The process above described for increasing the stiffness of a starch-filled and laundry-finished collar, cuff, &c., and making the body of the same impervious to perspiration and to water, in natural condition, and so that the said stiffness and imperviousness, arising from the presence of said soluble cotton, may readily be removed from the body of the said article by heated alkaline-water washings, the same consisting in forcing, (under pressure of suitable revolving flexible rollers,) into the substances of the starch-filled and laundry-finished body, of the article, a solution of soluble cotton and amyl acetate, acetone, &c., in condition of consistency described and freeing the surfaces of the article from all appearance of said solution, substantially as described.

3. The product of the herein-described process, the same consisting of a collar, cuff, &c., having a starched and ironed and laundry-finished body of fabric which is stiffened over normal laundry-produced stiffness and made impervious to perspiration and water, in natural condition, by means of soluble cotton contained in a suitable quantity in the combined substances of the body of said article, but wholly absent, in appearance from the surfaces of the same, and adapted to be wholly removed from said body by heated alkaline-water washings as practiced for washing soiled articles, substantially as described.

HENRY A. MANN.

Witnesses:
CHAS. A. MAHON,
ALEX. SELKIRK.